US012644323B2

(12) United States Patent
Ridley et al.

(10) Patent No.: US 12,644,323 B2
(45) Date of Patent: Jun. 2, 2026

(54) COUPLING AND ASSOCIATED METHODS

(71) Applicant: Safehinge Primera Limited, Glasgow (GB)

(72) Inventors: Shaun Ridley, Glasgow (GB); Max Szczerkowski, Glasgow (GB)

(73) Assignee: Safehinge Primera Limited, Glasgow (GB)

(*) Notice: Subject to any disclaimer, the term of this patent is extended or adjusted under 35 U.S.C. 154(b) by 0 days.

(21) Appl. No.: 18/727,277

(22) PCT Filed: Jan. 10, 2023

(86) PCT No.: PCT/GB2023/050034

§ 371 (c)(1),
(2) Date: Jul. 8, 2024

(87) PCT Pub. No.: WO2023/131804

PCT Pub. Date: Jul. 13, 2023

(65) Prior Publication Data

US 2025/0116142 A1 Apr. 10, 2025

(30) Foreign Application Priority Data

Jan. 10, 2022 (GB) .................................... 2200262

(51) Int. Cl.
*E05D 11/10* (2006.01)
*E05D 3/02* (2006.01)
*E05D 7/12* (2006.01)

(52) U.S. Cl.
CPC ................ *E05D 7/12* (2013.01); *E05D 3/02* (2013.01); *E05Y 2201/46* (2013.01); *E05Y 2900/132* (2013.01)

(58) Field of Classification Search
CPC ......... E05D 11/0054; E05D 2011/0063; E05D 2011/0072; E05D 3/122; E05D 3/02;
(Continued)

(56) References Cited

U.S. PATENT DOCUMENTS 3,707,017 A * 12/1972 Paquette .................. E05D 1/00 16/385
7,089,627 B2 * 8/2006 Seidler .................. B65D 51/04 206/823
(Continued)

FOREIGN PATENT DOCUMENTS

CN 202500418 U * 10/2012
GB 2351758 A 1/2001
(Continued)

OTHER PUBLICATIONS

International Search Report; PCT/GB2023/050034; Jan. 10, 2023.

*Primary Examiner* — Chuck Y Mah
(74) *Attorney, Agent, or Firm* — Dickinson Wright PLLC

(57) ABSTRACT

An anti-ligature magnetic coupling (10) with a coupling bracket (12) operatively associable with a support and a coupling connector (11) operatively associable with an object to be supported. The coupling connector (11) is connectable to the coupling bracket (12) with the bracket (12) having at least two magnets (20) arranged to define a combined magnetic field for supporting the object via the coupling connector (11). The coupling connector (11) has no magnets, but a ferromagnetic element attracted to the bracket's (12) combined magnetic field.

20 Claims, 8 Drawing Sheets

(58) Field of Classification Search
CPC .. E05D 1/00; E05D 7/009; E05D 7/12; E05C 17/54; E05Y 2900/132
See application file for complete search history.

(56) References Cited

U.S. PATENT DOCUMENTS

| | | | | |
|---|---|---|---|---|
| 7,467,440 | B2 * | 12/2008 | Seidler | B65D 51/04 16/320 |
| 2004/0134030 | A1 * | 7/2004 | Seidler | A45D 40/24 16/320 |
| 2006/0254025 | A1 * | 11/2006 | Danko | E05D 1/00 16/320 |
| 2010/0101149 | A1 * | 4/2010 | Keller | E06B 7/28 49/399 |
| 2013/0111818 | A1 * | 5/2013 | Yagi | E05D 7/1011 49/465 |
| 2020/0149330 | A1 * | 5/2020 | Ridley | E05D 7/1044 |

FOREIGN PATENT DOCUMENTS

| | | | | | |
|---|---|---|---|---|---|
| GB | 2537912 | B | * | 2/2019 | A47H 1/10 |
| GB | 2570179 | B | * | 1/2020 | E06B 9/323 |
| GB | 2588931 | A | | 5/2021 | |
| JP | 2002021411 | A | * | 1/2002 | E05D 7/081 |
| JP | 2005105788 | A | * | 4/2005 | E05D 7/125 |
| KR | 200308442 | Y1 | * | 3/2003 | E05D 1/06 |
| KR | 20170126250 | A | * | 11/2017 | G02C 5/2209 |
| KR | 101835998 | B1 | * | 3/2018 | B65D 43/16 |
| WO | WO2018189206 | A1 | | 10/2018 | |

* cited by examiner

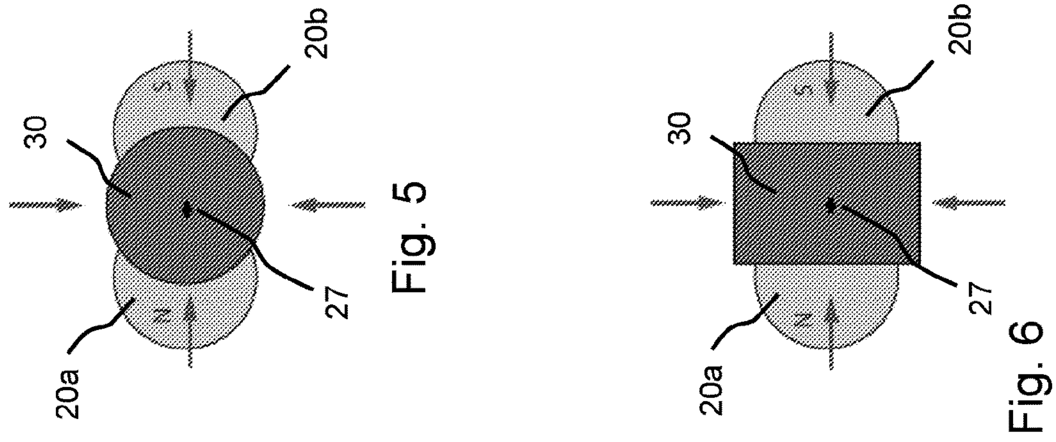
Fig. 5
Fig. 6
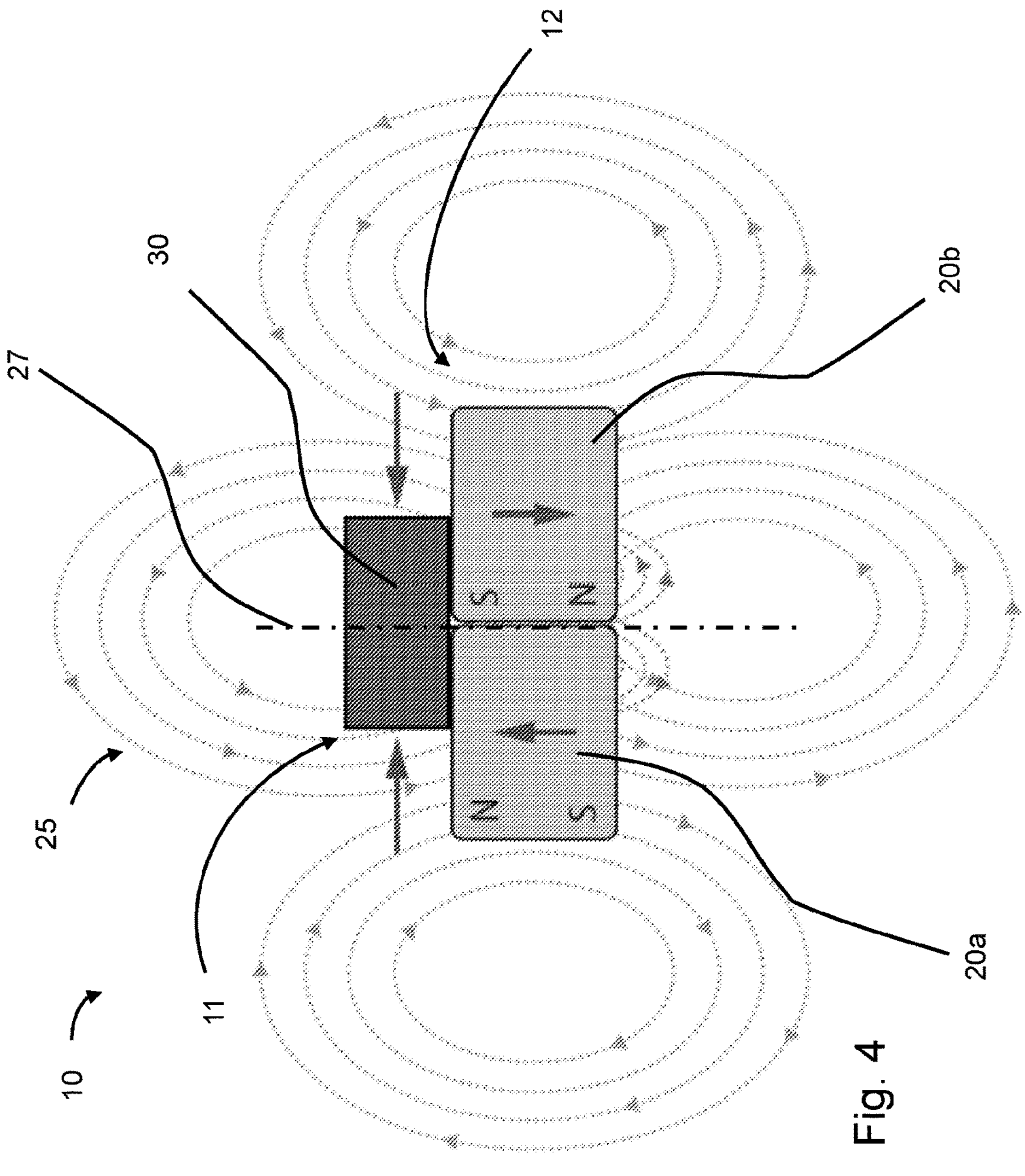
Fig. 4

COUPLING AND ASSOCIATED METHODS

CROSS-REFERENCE TO RELATED APPLICATIONS

The present application is a 35 U.S.C. Section 371 national stage filing of International Patent Application No. PCT/GB2023/050034, filed 10 Jan. 2023, and through which priority is claimed to UK application GB 2200262.0, filed 10 Jan. 2022.

TECHNICAL FIELD

This disclosure concerns a coupling and associated methods. In particular, but not exclusively, examples of this disclosure concern a coupling for mounting or attaching an object, such as a door leaf.

BACKGROUND

In buildings which house vulnerable individuals there is often a need to adapt aspects of the buildings to make them safer than conventional buildings. Such individuals are, in many cases, more liable to accidents and, in some case, may be prone to harming themselves intentionally.

One particular example of this is buildings which house individuals with mental health problems. Such individuals can be at risk of attempting to harm or kill themselves, and measures must be taken to minimise the risk of this.

One particular concern is that individuals may attempt to hang themselves. To mitigate the risk of this, individuals at risk are routinely deprived of materials which can be used as ligatures to hang themselves, such as belts, draw cords etc. However, there remains a risk that individuals will be able to obtain or fabricate something, such as by tearing strips of fabric from bedding, using headphone cables or the like. These can be looped around ligature points.

Accordingly a parallel approach of eliminating ligature points in rooms where vulnerable individuals are to be left unsupervised is often undertaken. This can involve elimination of any points where a cord or the like can be secured in order to bear the weight of the person trying to hang themselves.

Doors provide a specific challenge in providing an anti-ligature assembly. By their hanging nature there are number of features which provides various ligature points, in particular door handles, hinges, and the top of the door. For example, in a conventional butt hinge door, the top hinge is a ligature point.

This is especially the case with doors which require to self-close, e.g. in line with fire regulations or for security or privacy purposes. Self-closing mechanisms, such as the commonly used face-fixed spring lever arm provide a ligature point.

Various devices have been proposed which aim to reduce or eliminate the presence of ligature points in door assemblies. For example, the following systems are on the market:

Intastop Anti-ligature Hinge—this is a continuous geared hinge system, which is comparatively complex and challenging to install, and is expensive.

Dorma ITS96 Concealed Door Closer—this system uses a spring arm which is concealed between the transom and the door when the door is closed, but there is still a possible ligature point around the level and also around the door hinges.

A continuous (full length) butt hinge (akin to a piano hinge) along the door—such a system avoids ligature points on the hinge, but adding a separate door closer system would add a ligature point. Additionally, a continuous hinge along the full length of a door requires the door and the frame to be well aligned, can be difficult to install correctly, and can add considerable friction, especially if the edge of the frame or door is not perfectly straight.

A door that is cut shorter than full length, typically with an angled top to encourage any ligature attempt on the top of the door to slide off. The present inventors have identified that this approach does not eliminate ligature risks as one can be created by using the door in the closed position and trapping a bedsheet in the top corner against the door frame.

SUMMARY

The present inventors have recognised that all of the prior art systems have associated limitations or problems. In addition, they have considered other objects, such as towels, rails, soap bars, holders as potential ligature dangers. Accordingly, the present inventors considered that there remains a need for alternative or improved coupling for attaching objects, particularly door assemblies or the like, for use in situations where anti-ligature properties are desired.

According to a first aspect there is provided a coupling. The coupling may comprise an anti-ligature coupling. The coupling may comprise a coupling bracket, such as for association with a support. The coupling bracket may be for attachment to the support. The coupling bracket may be for permanent attachment to the support. For example, the coupling bracket may be non-detachably fastened or fixed to the support. The support may be a portion of a building, such as a wall or ceiling. In at least some examples, the coupling bracket may be comprised in the support. For example the coupling bracket may be at least partially recessed in the support. The coupling bracket may be integrally-formed with the support. The coupling bracket may be structurally incorporated in the fabric of the support. For example, particularly where the support is a doorframe, furniture or construction component, the support may comprise the coupling bracket such that the coupling bracket need not be subsequently fastened or fixed to the support.

The coupling may be a mount. The coupling may be for an object to be supported, such as for an object to be hung, suspended, or attached to a fixture, such as a wall, ceiling, furniture, or the like. The object may be in or for a building which houses a vulnerable individual/s, such as with mental health problems. The object may be configured to mitigate against harm, such as via accident and/or self-harming.

The coupling may comprise a coupling connector, the coupling connector being configured for connection to the coupling bracket to make or complete the coupling. Accordingly, the coupling may comprise a coupling bracket and a coupling connector.

The coupling may comprise a magnetic coupling. The magnetic coupling may comprise a coupling connector configured to be magnetically coupled to the magnetic coupling bracket. For example, the coupling bracket may comprise a magnet and the coupling connector may comprise a magnetic material to be acted upon by the magnet. The magnetic material may comprise a ferromagnetic material, such as an iron-based material or component. The coupling connector may be devoid of magnets. The only magnet/s of the magnetic coupling may be comprised in the coupling bracket. All magnets of the coupling may be comprised in the coupling bracket. The coupling bracket may comprise the magnet and the coupling connector may comprise a non-magnet (ferro)magnetic material, attracted to the coupling bracket's magnet. Thus, the coupling connector—and the object associated therewith-when disconnected and detached may be magnet-free; such as to reduce a risk of magnet ingestion or use to attach or trap other elements to the disconnected object. In at least some examples, the magnet of the coupling bracket may comprise a permanent magnet.

Accordingly, in at least one example, there is provided an anti-ligature coupling, the coupling comprising:

a coupling bracket operatively associable with a support; and a coupling connector operatively associable with an object to be supported;

the coupling connector being connectable to the coupling bracket;

wherein the bracket comprises at least one magnet arranged to define a magnetic field for supporting the object via the coupling connector;

wherein no magnet is comprised in the coupling connector, the coupling connector comprising a ferromagnetic element configured to be attracted to the bracket's magnet; and wherein the coupling connector is disconnectable from the coupling bracket when a force on the connector exceeds a magnetic attractive force between the coupling bracket and the coupling connector.

The magnetic coupling may be configured to magnetically locate the object. The magnetic coupling may be configured to locate or position the object relative to the support primarily magnetically. The coupling may be configured to magnetically define the location or position of the connector relative to the bracket. The magnetic coupling may be configured to define the position or location of the object relative to the support, when the object is supported by the coupling, entirely magnetically. The magnetic coupling may be configured to locate or position the object relative to the support without requiring a mechanical location or position feature. The magnetic coupling may magnetically define a location or position of the connector with such sufficient accuracy or low tolerance that no additional feature or mechanism is required to locate or position the connector relative to the backet. The bracket and/or connector may be devoid of mechanical locating or centering features. The coupling may be configured to support the object entirely magnetically.

In at least some examples, the coupling may be configured to provide both magnetic and mechanical locating or centering features. For example, the coupling bracket and/or the coupling connector may comprise a mechanical centering or locating feature for centering or locating the coupling connector relative to the coupling bracket. The coupling may comprise an inter-engaging mechanical coupling arrangement, such as whereby one of the coupling bracket or coupling connector comprises a male part or feature and the other comprises a female part or feature. Preferably, the coupling bracket is devoid of projecting mechanical features (e.g. a male part). Accordingly, where the coupling bracket comprises a mechanical centering or locating feature, this may be a recess for receiving a portion of the coupling connector.

The coupling may be configured such that the ferromagnetic element of the coupling connector self locates when the footprint of the steel does not cross over the edge of another field ring. The coupling may be configured by dimensioning the ferromagnetic element relative to the magnet/s such that the ferromagnetic element self locates. The coupling may be configured such that a thickness of the material of the coupling connector and/or the coupling bracket (e.g. a housing/s external to the magnet/s and ferromagnetic element respectively) does not impact the self locating. The ferromagnetic element may comprise a footprint sufficiently small to self-locate in the magnetic field defined by the coupling bracket.

The coupling bracket may comprise a plurality of magnets. The coupling bracket may comprise at least two magnets. The at least two magnets may be arranged so as to define a combined magnetic field. The combined magnetic field may be greater than that of an individual magnet of the at least two magnets. The at least two magnets may be arranged to align at last a portion of their respective magnetic fields. The at least two magnets may be arranged to align at last a portion of their respective magnetic fields such that the magnetic field portions are substantially parallel and acting in a same direction. In particular, the at least two magnets may be configured to define a common or central pole. The common or central pole may be defined or created by the alignment of the portions of the respective magnets. The common or central pole may be sufficiently strong relative to other portions of the magnetic field to attract the ferromagnetic element thereto. Accordingly, the ferromagnetic element may be attracted to a predefined portion, pole or position as defined communally by the plurality of magnets (e.g. the common or central pole). The plurality of magnets may provide for a stronger magnetic field and/or a more precise positioning and/or a greater attractive force relative to a single magnet (e.g. one of the plurality of magnets in isolation; and/or a singular magnet of similar total mass/material as the total of the plurality of magnets combined). The plurality of magnets may define or generate a magnetic field sufficiently strong that merely a ferromagnetic material is required in the coupling connector to support the object—and no magnet as such is required in the coupling connector.

The magnet/s may be configured to define a magnetic field such that the ferromagnetic element of the coupling connector is attracted thereto and also can be oriented thereby. The magnet/s may be configured to define a three-dimensional magnetic field such that the ferromagnetic element of the coupling connector is attracted thereto and also can be oriented thereby. The coupling may be configured to magnetically define an orientation of the coupling connector relative to the coupling bracket. The common or central pole defined by the plurality of magnets may determine the orientation of the ferromagnetic element, and thereby the coupling connector, when the coupling connector is magnetically coupled to the coupling bracket.

The plurality of magnets may comprise at least a pair of magnets. The pair of magnets may comprise two magnets arranged side by side. The side-by-side arrangement may be configured to create the common or central pole to attract the ferromagnetic element into a central position defined between the magnets of the pair. The arrangement of the pair of magnets may provide additional field strength in the centre where the two magnets, or at least their respective magnetic fields, meet. The additional strength may be relative to a single one of the magnets in isolation. Accordingly, the coupling bracket may automatically locate the coupling connector relative to the coupling bracket. The pair of magnets may be arranged side by side such that the coupling connector is centrally located relative thereto or therebetween. Each of the magnets of the pair may be substantially the same. For example, each of the magnets of the pair may comprise similar properties, such as material and/or dimensions and/or orientation. The magnetic field at the common or central pole may provide additional strength or force relative to the magnetic field of each of the individual magnets associated therewith that the ferromagnetic element has a far greater attraction to the central or common pole than other portions of the magnetic field. The additional strength of the common or central pole may be sufficiently great to overcome any contact forces, such as friction, between the coupling connector and the coupling bracket such that the coupling connector automatically centers on the common or central pole of the coupling bracket.

The/each magnet may comprise a permanent magnet. The/each magnet may comprise a cylindrical magnet. Additionally, or alternatively, the/each magnet may comprise a flat magnet.

The magnetic force defined by the magnetic coupling bracket may be predetermined. The magnetic force may comprise a maximum magnetic attractive force. The magnetic force may be predetermined in dependence on the object to be supported. For example, where the coupling is for a door, such as for a door hinge, the magnetic force may be configured to be less than 20 kg; even less than 10 kg; and in at least some examples, the coupling may be configured to release at weight or force of 5 kg—or even less than 5 kg in particular instances. The provision of the plurality of magnets with the common or central pole may be such that the tolerance for positioning and/or relative release force may be less than in convention magnetic couplings, such as where a singular magnet may be provided. For example, the arrangement with the plurality of magnets may enable a lower release force than with a comparable coupling as defined in Applicant's earlier patent application, PCT/EP2018/059206 published as WO2018189206, the full contents of which are incorporated herein by reference.

Whenever the magnetic force is exceeded, the coupling connector disconnects or detaches from the coupling bracket. Accordingly, the coupling is configured to mitigate against a support of undesired objects, such as a ligature, from the coupling or coupling bracket. The coupling can be made or re-made by bringing the coupling connector into suitable proximity of the coupling bracket for the coupling bracket's magnetic force to act on the coupling connector's ferromagnetic element.

The ferromagnetic element of the coupling connector may be asymmetrical in at least one dimension. The ferromagnetic element may comprise a longitudinal axis in at least one plane, the longitudinal axis defining a major dimension of the ferromagnetic element, the major dimension being greater than a minor dimension of the ferromagnetic element, the minor dimension being in a direction perpendicular to the longitudinal axis. The ferromagnetic element may be asymmetrical and arranged in the coupling connector such that the ferromagnetic element defines a magnetic orientation of the coupling connector. Accordingly the position when coupled of the coupling connector relative to the coupling bracket may be defined by a position of the ferromagnetic element of or within the coupling connector. In addition, the orientation when coupled of the coupling connector relative to the coupling bracket may be defined by an orientation of the ferromagnetic element of or within the coupling connector.

In other embodiments, the ferromagnetic element may comprise symmetry in at least one dimension. The ferromagnetic element may be rotationally symmetrical in at least one plane. The ferromagnetic element may be rotationally symmetrical in at least one plane that is perpendicular to the common or central pole of the magnets of the coupling bracket. Accordingly the coupling connector may be locatable in any orientation in that plane. Such a coupling may be particularly suited to applications whereby the orientation of the object to the support is less or not important. For example, where the coupling is for a bar of soap or another object suspended vertically from a support directly thereabove, the orientation of the object is less important than, for example, a door. Likewise, where the object as such is symmetrical or does not otherwise require alignment relative to the support, then the symmetrical ferromagnetic element may be preferred compared to the asymmetrical ferromagnetic element.

The coupling may provide a horizontal connection of the coupling connector to the wall mounted bracket.

The coupling bracket may comprise an anti-ligature bracket. The anti-ligature bracket may comprise a mount with a sufficiently low profile so as to mitigate against any securement or support of or for a ligature.

It will be appreciated that the object may be supported or connected with a plurality of couplings. For example, a door leaf may be supported to a wall or doorframe with a pair of couplings, such as located at or towards a top and a bottom of the leaf. Likewise, a relatively large or long object, such as a linear rail or the like (e.g. shower rail, curtain rail, towel rail, etc.) may be supported with a plurality of couplings, such as at or towards each end of the object and/or distributed along a length of the object (e.g. evenly spaced along the object). The plurality of couplings may be configured to support the object entirely magnetically.

The object may comprise an anti-ligature object. The object may comprise a domestic object or fitting, such as selected from: a door (leaf); a soap dish; a coat hanger; a towel rail (e.g. with one or more couplings for attachment to a support, such as a wall); a towel ring; a curtain rail; a clothes rail; a toilet roll holder; and/or a shelf holder.

Accordingly, a single facility or room may comprise a plurality of couplings, including a plurality of types of couplings. The plurality of couplings may comprise couplings of different ratings and/or different physical dimensions. The/each coupling may be configured to support a particular or predefined object. The coupling may be specifically adapted or configured to support a weight and/or supported use of the predefined object. For example, the coupling may comprise a predefined attractive force between the coupling bracket and the coupling connector. The predefined attractive force may be selected to be of a magnitude corresponding to a weight of the object to be supported. The predefined attractive force may comprise a weight of the object plus an additional buffer force. The additional buffer force may be associated with a use of the object to be supported. For example, where the object's weight may change in use, such as between a dry and a wet towel, the additional buffer force may be sufficient to accommodate a maximum wet towel weight. The additional buffer force may be less than a maximum buffer force. Ensuring the additional buffer force does not exceed the maximum buffer force may be advantageous in preventing undesired use of the coupling, such as to support a ligature or other abuse of the coupling.

The coupling may be suitable for a door, such as for an anti-ligature door. The coupling may comprise a coupling hinge. The coupling bracket may comprise a hinge bracket, such as operatively associable with the support. The coupling connector may comprise a hinge member, such as operatively associable with a leaf. The hinge member may be connectable to the hinge bracket via the coupling connector. The coupling connector may comprise the hinge member. The hinge member may define an axis of rotation of the leaf, such as for rotation of the leaf relative to the hinge bracket. In at least some examples, the hinge member may be rotatable relative to the hinge bracket about the axis of rotation. The hinge member may be directly connectable to the hinge bracket. Alternatively, the hinge bracket may be indirectly connectable to the hinge bracket, such as where the hinge is rotatably connected to the coupling connector. The hinge member may be disconnectable from the hinge bracket by the coupling connector disconnecting from the coupling bracket. Accordingly, the hinge member may be disconnectable from the hinge bracket in response to at least one force threshold. The at least one force threshold may comprise a transverse threshold force comprising a transverse force component transverse to the axis of rotation. In at least some examples, the hinge member may be disconnectable in response to the same transverse threshold force in at least two directions transverse to the axis of rotation. In at least some examples, the hinge member may be disconnectable in response to the same transverse threshold force in all directions transverse to the axis of rotation. Additionally, or alternatively, the at least one force threshold may comprise an axial threshold force comprising a force component acting along the axis of rotation. The hinge member may be disconnectable in response to the same threshold force in either direction along the axis of rotation, such as vertically up and vertically downwards. at least two directions transverse to the axis of rotation In at least some examples, the at least one force threshold may be selected from one or more of: the transverse threshold force; and/or the axial threshold force.

In contrast to prior art couplings, at least some examples of the present disclosure may allow the supported object to be disconnected in response to a similar magnitude of transverse force from at least two directions. For instance, such examples may allow the coupling conector to be disconnected in response to a same force from opposite sides of the coupling connector (e.g. the threshold force may be the same whether the object is pushed inwards or outwards—or whether the object is pushed or pulled).

Likewise, in contrast to prior art hinges (such as a conventional butt hinge unresponsive to an axial force, particularly an axial force purely along the axis of rotation), at least some examples of the present disclosure enable disconnection of the hinge member from the hinge bracket in response to an axial force exceeding the axial force threshold. Accordingly, such examples may allow disconnection of the hinge (and leaf) from the hinge bracket in response to a purely axial force acting at the hinge. Similarly, such examples may allow disconnection of the hinge member from the hinge bracket when an axial force threshold is reached, irrespective of whether the hinge is responsive to a transverse force threshold or whether a transverse force threshold has been reached. Particularly where the axis of rotation is vertical, such hinges may be useful in preventing the hinge and/or associated leaf from supporting an excessive weight. The threshold force may be predetermined, such as to accommodate a particular weight of leaf. The threshold force may be selected, such as according to an envisage use and/or risk.

The coupling bracket and the coupling connector may be connectable by a coupling arrangement, such as an interengaging coupling arrangement. The coupling connector may comprise a hinge biasing means. The hinge biasing means may bias the hinge portion or component of the coupling connector. The hinge biasing means may at least partially determine the at least one threshold force. The hinge biasing means may comprise a resilient member, such as a spring. The hinge biasing means may bias the hinge portion of the coupling connector (e.g. attached to a door leaf) to a preferred position (such as a door closed position). The hinge biasing means may bias or propel rotation of the object, such as the door leaf, about the axis of rotation of the coupling connector.

The coupling connector may be disconnectable from the coupling bracket in any direction parallel to and/or away from the bracket. The coupling connector may be disconnectable from the coupling bracket in either/both direction along the axis of rotation. Additionally, or alternatively, the coupling connector may be disconnectable from the coupling bracket in a direction transverse to the axis of rotation.

The transverse direction may comprise a direction in a plane perpendicular to the axis of rotation. The transverse direction may comprise a direction perpendicular to the axis of rotation. The hinge member may be disconnectable in response to the same transverse threshold force in at least three directions transverse to the axis of rotation. The transverse force threshold may be independent of the direction of transverse force. For example, the hinge member may be disconnectable from the hinge bracket in response to a transverse force threshold being reached, the transverse force threshold being the same for any direction of force in the plane perpendicular to the axis of rotation.

The threshold force may be greater than a force required to open and/or close the leaf, such as in normal use to open and/or close the leaf. The threshold force may be less than a force required to create or support a ligature. The threshold force may be less than a maximum force that can be exercised by a single person on the leaf. For example, the threshold force may less than a pushing force, such as to barge the leaf open. The threshold force may be a component of a non-perpendicular force, such as a component of a tangential force associated with rotation of the leaf about the axis of rotation (e.g. acting to open or close the leaf).

The hinge may be for any leaf, the leaf comprising any movable member, such as any closure. In at least some examples, the support may comprise one or more of: a jamb; a frame; a wall; a post; a lintel. The hinge may be for attaching the movable member, such as a door, shutter, window or the like to the support, such as a wall or frame or the like. The hinge bracket may comprise a fixed device, such as for attachment to a fixed surface (e.g. of a jamb, lintel, frame, wall, or the like). The hinge member may comprise a movable device, such as for attachment to the movable member, such as a movable leaf (e.g. a door leaf, window, shutter, flap, hatch, or the like). The leaf may comprise one or more of: a door leaf, a window leaf, a shutter leaf, a gate leaf, a hatch leaf, a panel; an en-suite door leaf; a door leaf for an internal door; a shower door leaf; a bathroom door leaf; a changing room door leaf; a toilet door leaf; a cubicle door leaf.

The coupling may be configured to eliminate or at least mitigate a risk of an element being trapped in, inserted into or supported by the coupling. The element may comprise a ligature. In at least some examples, the element may comprise a body part, such as a human digit. The coupling may be configured to ensure that there is no more than a maximum clearance, such as between the coupling bracket and the coupling connector when connected. The hinge may be configured to define the maximum clearance between parts. The maximum clearance may be sufficiently small to eliminate or at least reduce the risk of element insertion or trapping. The maximum clearance may be applicable to any separation or gap, such as between the hinge bracket and the support; and/or between the hinge member and the hinge bracket; and/or between the leaf and the hinge bracket; and/or between the leaf and the support. The risk of element trapping may be reduced or eliminated by labyrinthine or backing geometry, so as to conceal and/or shield a gap or interface between parts, such as between moving parts (e.g. the components of the coupling connector).

The coupling arrangement of the coupling connector to the coupling bracket may be at least partially rotationally symmetrical, particularly describing an arc of intended usability about the axis of rotation. The rotational symmetry of the coupling arrangement, such as an interface therebetween, may reduce a risk of an element such as a ligature being wedged or trapped by relative rotation between the components of the coupling connector.

The hinge may comprise a leaf biasing means. The leaf biasing means may comprise a leaf biasing member. In at least some examples, the leaf biasing means may comprise a leaf-closer. The leaf biasing means may bias the leaf towards a rest position, such as a leaf closed position. The hinge biasing means may comprise the leaf biasing means. For example, a hinge biasing means may exert a torque about the axis of rotation to bias the hinge member to a preferred rotational orientation relative to the coupling bracket, such as corresponding to the leaf's rest position. In at least some examples, the leaf biasing means may comprise a resilient member, such as a spring. Additionally, or alternatively, the biasing means may comprise a gravity-based biasing means, or component thereof. For example, the hinge may comprise an angled coupling arrangement, such as a helical or part-helical interface, to bias the hinge member under a weight of the leaf to a preferred rotational position about the axis of rotation, such as corresponding to the leaf rest position.

The hinge may be configured to eliminate or reduce hanging points. For example, the hinge may comprise surfaces sloped or directed downwards to ensure a ligature thereon may be guided off the hinge so that the hinge cannot support the ligature.

The hinge may be configured to prevent or at least impede reconnection of the hinge member and the hinge bracket following disconnection. Preventing or impeding reconnection may minimise or obviate a risk of an element such as a ligature being inserted, such as between the hinge member and hinge bracket or between the leaf and the support. Preventing or impeding reconnection may provide an indication of tamper or abuse.

The hinge may comprise a bearing. For example, the hinge bracket may comprise the bearing for guiding the relative rotational movement between the hinge bracket and hinge member. The bearing may be housed at least partially internally or concealed within the hinge. Accordingly, exposure of relatively moving surface may be reduced, such as to reduce a risk of wedging or entrapment.

According to a further aspect, there is provide a mounting system comprising the coupling of any other aspect, example, claim or embodiment; and an object to be supported, such as the leaf of any other aspect, example, embodiment or claim.

The mounting system may comprise a plurality of couplings. The plurality of couplings may comprise at least a pair of couplings. The pair of couplings may be aligned on the same axis of rotation. In at least some examples, the couplings may comprise similar features. For example, each hinge may comprise a similar hinge biasing means. Each hinge may be configured to release at a threshold force. The threshold force/s of each hinge may be similar. In at least some examples, at least one hinge of the plurality may comprise one or more dissimilar hinge features. For example, each of the couplings of the plurality may comprise a different threshold force/s. The leaf system may comprise a plurality of couplings whereby each hinge may provide a leaf biasing means. In other leaf systems, not all couplings may comprise a leaf biasing means.

In at least some examples, the pair of couplings may be oppositely-oriented. For example, the hinge bracket of a first hinge of the pair may be opposingly oriented, such as with the hinge brackets of the pair facing each other. Particularly in examples where the axis of rotation is a vertical axis, the respective couplings of the pair may be oriented upwards and downwards respectively. Additionally, or alternatively, the plurality of couplings may be oriented in a same direction. For example, at least two couplings of the plurality may be oriented in a similar direction, such as with each hinge bracket facing upwards to be similarly gravity load-bearing.

A single leaf may be supported by the pair of couplings, with the pair of couplings being located at or towards a top and a bottom of the leaf respectively. The leaf may be mounted between the couplings, such as with the leaf being positioned on the axis of rotation so that the axis of rotation passes directly through the leaf, such as through a medial plane of the leaf. Accordingly, the leaf may be bidirectionally rotatable under a similar magnitude of force (e.g. a similar force to move leaf in either rotational direction).

In at least some examples, the leaf system may comprise more than two couplings. For example, at least some leaf systems may comprise three or more couplings aligned along the axis of rotation. The three or more couplings may all be face in a same orientation, such as with each bracket facing upwards. There may be multiple pairs along one axis of rotation. A plurality of couplings or pairs of couplings may be particularly useful for longer and/or heavier doors.

The hinge member may comprise a nib, such as a leaf nib. The leaf may comprise the hinge member. The hinge member may be integrally-formed with the leaf. Alternatively, the hinge member may be mounted, such as permanently-mounted, to the leaf.

According to a further aspect there is provided a plurality of leaf systems according to any other aspect, example, embodiment or claim. In at least some examples, a pair of leaf systems may be provided. Each leaf system may be associated with a respective leaf. For example, a double-leaf system comprising a pair of leafs may comprise a pair of leaf systems. Each leaf system may comprise at least one coupling or a pair of couplings associated with each leaf.

The leaf may comprise a leaf of a door. The door may comprise an anti-barricade door. The door may comprise a double-action door (also known as a double-swing door), which can open both ways (e.g. inwards and outwards). The door may comprise a saloon-style door. The door leaf may comprise a saloon-style door leaf. The leaf may not protrude or extend axially beyond at least one hinge. In at least some examples the leaf extends axially only between the hinges. The leaf may terminate axially at the hinge. Particularly, where the axis of rotation is vertical, limiting an axial extension of a leaf so that it does not extend vertically above an upper or uppermost hinge may reduce a risk of an element such as a ligature being placed over the leaf and supported by the hinge bracket. In at least some examples, the upper hinge bracket may extend axially above the leaf. Accordingly, an element such as a ligature placed over the hinge bracket may be unsupported by the hinge bracket, with the element being guided downwards onto the leaf.

The leaf may comprise a lightweight leaf. The leaf may be sufficiently lightweight to reduce a risk of use of a (disconnected) leaf as a weapon, barricade, shield or the like. The leaf may be sufficiently lightweight to allow an opening and/or closing force of the leaf to be less than a ligature force or force required to support a ligature. The leaf may be flexible, such as to allow deformation.

The leaf may be axially deformable. The leaf may be axially deformable so as to allow the hinge member of a leaf member mounted between a pair of hinge brackets to displace sufficiently from the corresponding hinge bracket to disconnect. Accordingly, the hinge member may be disconnectable from the hinge bracket under a purely axial force along the axis of rotation.

According to an aspect, there is provided an array of couplings. The array of couplings may comprise couplings of different ratings and/or different physical dimensions, such as outlined herein.

According to a further aspect there is provided a method of supporting or suspending an object. The method may comprise operatively associating a coupling bracket with a support. The method may comprise operatively associating a coupling connector with the object to be supported or suspended. The method may comprise connecting the coupling connector to the coupling bracket. The method may comprise disconnecting the coupling connector from the coupling bracket in response to at least one force threshold.

The invention includes one or more corresponding aspects, embodiments or features in isolation or in various combinations whether or not specifically stated (including claimed) in that combination or in isolation. For example, it will readily be appreciated that features recited as optional with respect to the first aspect may be additionally applicable with respect to the other aspects without the need to explicitly and unnecessarily list those various combinations and permutations here (e.g. the device of one aspect may comprise features of any other aspect). Optional features as recited in respect of a method may be additionally applicable to an apparatus or device; and vice versa.

In addition, corresponding means for performing one or more of the discussed functions are also within the present disclosure.

It will be appreciated that one or more embodiments/aspects may be useful in at least supporting or suspending an object, such as hanging or hinging a leaf.

The above summary is intended to be merely exemplary and non-limiting.

It may be an aim of certain embodiments of the present disclosure to solve, mitigate or obviate, at least partly, at least one of the problems and/or disadvantages associated with the prior art. Certain embodiments or examples may aim to provide at least one of the advantages described herein.

BRIEF DESCRIPTION OF THE DRAWINGS

These and other aspects of the present invention will now be described, by way of example only, with reference to the accompanying drawings, in which:

FIG. 4 shows a schematic side view of the magnetic field associated with the coupling bracket with a ferromagnetic element of a coupling connector of the coupling of FIG. 1;

FIG. 5 shows a schematic view of magnets of FIG. 3 with a first ferromagnetic element;

FIG. 6 shows a schematic view of magnets of FIG. 3 with a second ferromagnetic element;

DETAILED DESCRIPTION

Figure 2:
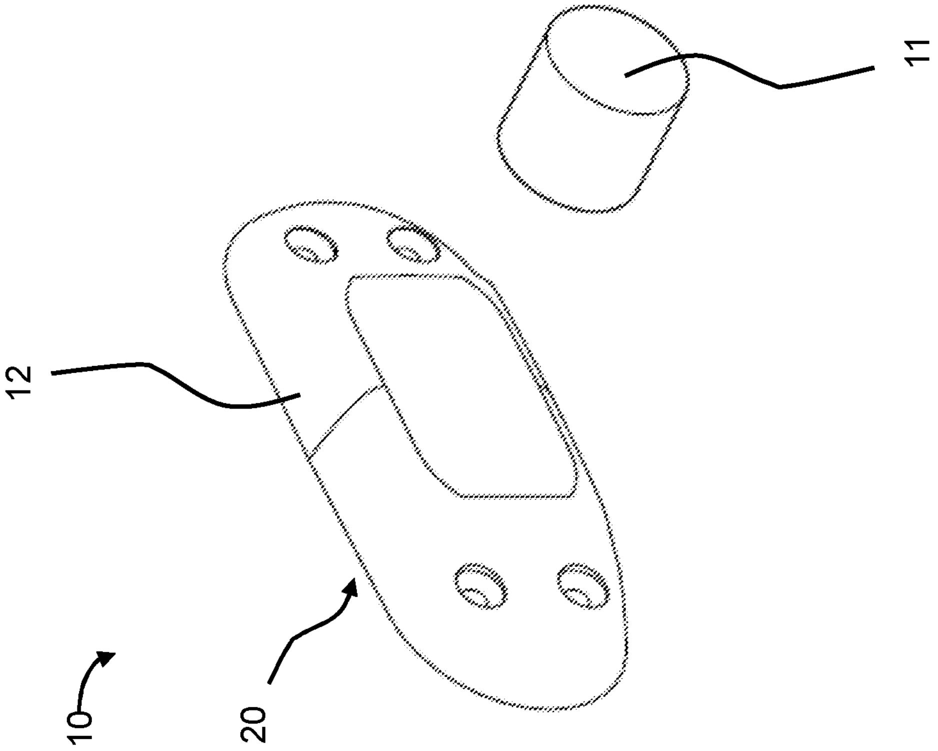
FIG. 2 shows the coupling of FIG. 1 in a disconnected configuration.
Figure 1:
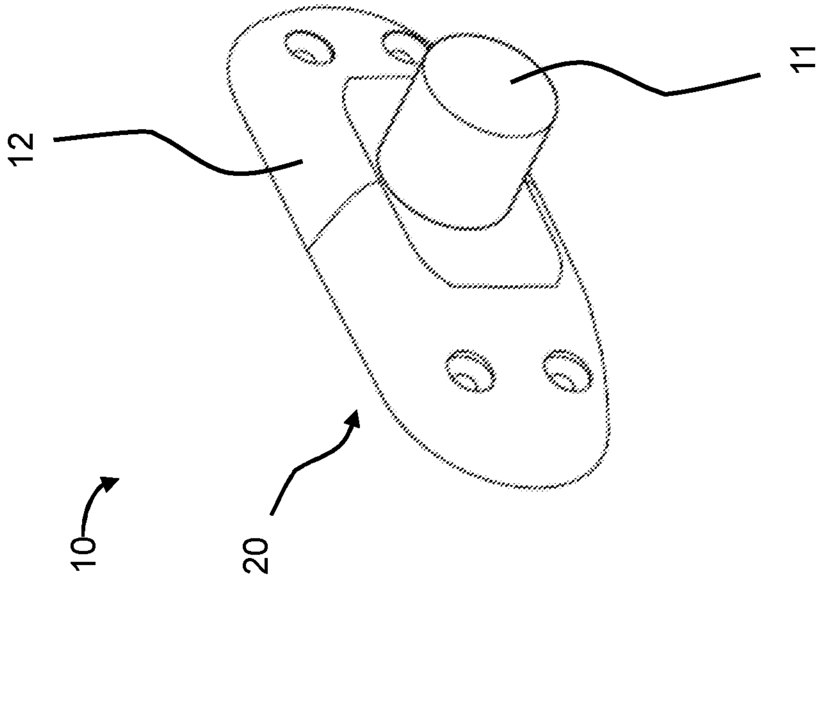
FIG. 1 shows a first example of a coupling according to this disclosure.

Referring to FIG. 1 there is shown an anti-ligature coupling 10. As shown here, the coupling 10 comprises a coupling bracket 12 operatively associable with a support (not shown in FIG. 1, see e.g. the support 15 in the form of a doorframe of FIG. 7). The coupling 10 further comprises a coupling connector 11 operatively associable with an object to be supported (not shown in FIG. 1, see e.g. the door leaf 16 shown in FIG. 7). As shown in the transition from FIG. 2 to FIG. 1, the coupling connector 11 here is connectable to the coupling bracket 12. FIG. 2 shows the coupling connector 11 disconnected from the coupling bracket 12, which is shown in the connected configuration in FIG. 1. The bracket 12 comprises at least one magnet arranged to define a magnetic field for supporting the object via the coupling connector 11. No magnet is comprised in the coupling connector 11. The coupling connector 11 comprises a ferromagnetic element (see e.g. FIG. 10) configured to be attracted to the bracket's magnet. The coupling connector 11 is disconnectable from the coupling bracket 12 when a force on the connector exceeds a magnetic attractive force between the coupling bracket 12 and the coupling connector 11, as shown in FIG. 2.

Figure 3:
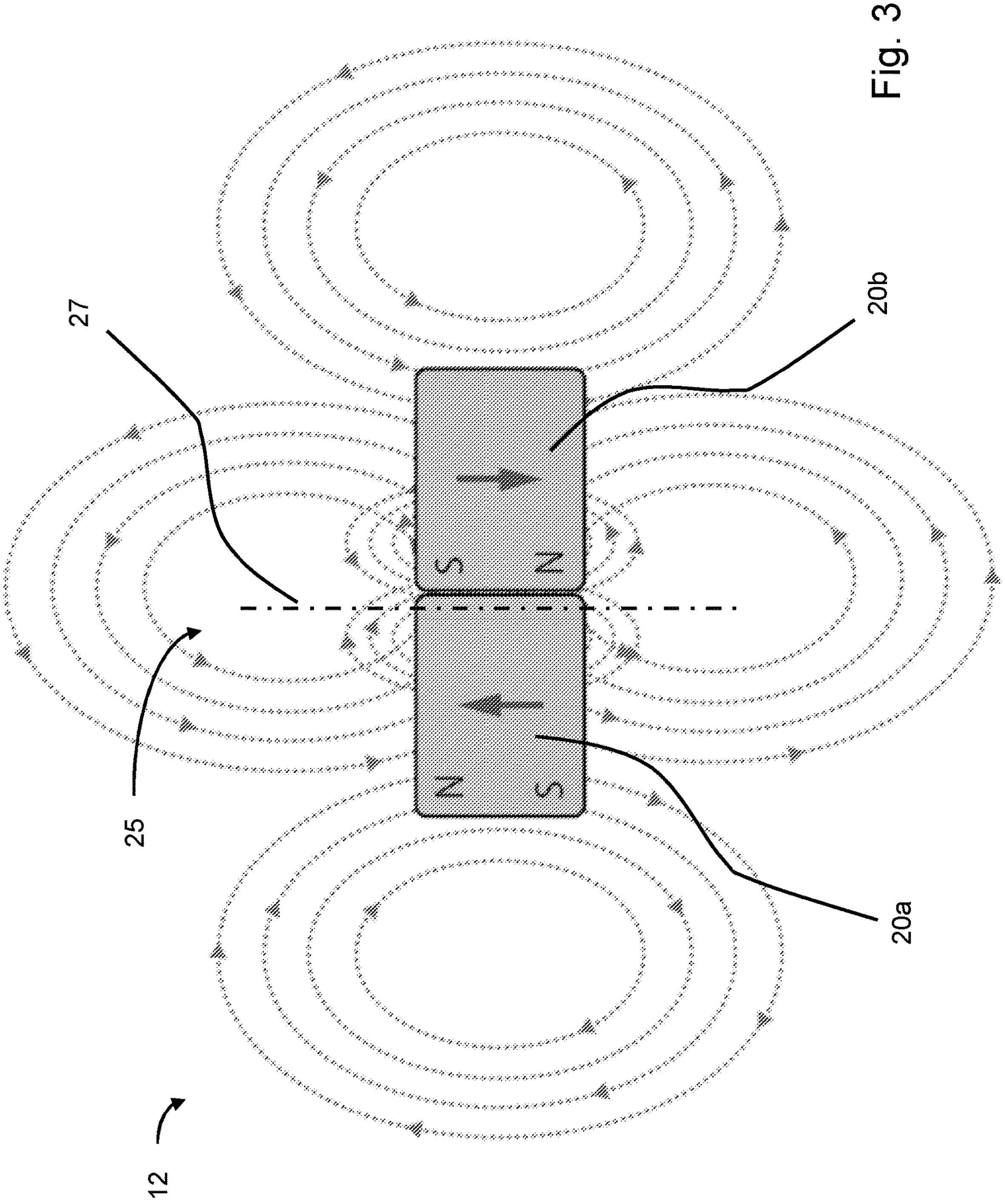
FIG. 3 shows a schematic side view of a magnetic field associated with a coupling bracket of the coupling of FIG. 1.

FIG. 3 shows a schematic side view of a magnetic field associated with a coupling bracket of the coupling of FIG. 1. In the particular example shown, the bracket 12 comprises at least two magnets 20, shown here as a pair 20*a*, 20*b*. The pair of magnets 20*a*, 20*b* are arranged so as to define a combined magnetic field 25, as shown in FIGS. 3 and 4. The combined magnetic field 25 is greater than that of an individual magnet 20*a* or 20*b* of the pair of magnets 20*a*, 20*b*. The pair of magnets 20*a*, 20*b* are arranged to align at last a portion of their respective magnetic fields such that the magnetic field portions are substantially parallel and acting in a same direction. In particular, the pair of magnets 20*a*, 20*b* are configured to define a common or central pole 27. The common or central pole 27 is defined or created by the alignment of the portions of the respective magnets 20*a*, 20*b*.

The pair of magnets 20*a*, 20*b* are arranged side by side. The side-by-side arrangement is configured to create the common or central pole 27 to attract the ferromagnetic element (30, as shown in FIG. 4) into a central position defined between the magnets 20*a*, 20*b* of the pair. The arrangement of the pair of magnets 20*a*, 20*b* provides additional field strength in the centre where the two magnets 20*a*, 20*b*, and their respective magnetic fields, meet. The additional strength is relative to a single one of the magnets 20*a*, 20*b* in isolation. Accordingly, the coupling bracket 12 automatically locates the coupling connector (11, as shown in, for example, FIG. 8) relative to the coupling bracket 12. The pair of magnets 20*a*, 20*b* are arranged side by side such that the coupling connector 11 is centrally located relative thereto or therebetween—as shown in each of FIGS. 4, 5 and 6 respectively. Each of the magnets 20*a*, 20*b* of the pair is substantially the same: here each of the magnets 20*a*, 20*b* of the pair comprises similar properties, including material and dimensions and orientation. Each magnet 20*a*, 20*b* shown here comprises a permanent magnet, which are both cylindrical flat magnets. The magnetic field 25 at the common or central pole 27 provides additional strength or force relative to the magnetic field of each of the individual magnets 20*a*, 20*b* associated therewith that the ferromagnetic element 30 has a far greater attraction to the central or common pole 27 than other portions of the magnetic field 25. The additional strength of the common or central pole 27 is sufficiently great to overcome any contact forces, such as friction, between the coupling connector 11 and the coupling bracket 12 such that the coupling connector 11 automatically centers on the common or central pole 27 of the coupling bracket 12.

FIG. 4 shows a schematic side view of the magnetic field 25 associated with the coupling bracket 12 with a ferromagnetic element 30 of a coupling connector 11 of the coupling 10 of FIG. 1. The common or central pole 27 is sufficiently strong relative to other portions of the magnetic field to attract the ferromagnetic element 30 thereto. Accordingly, the ferromagnetic element 30 is attracted to a predefined portion, pole or position as defined communally by pair of magnets 20*a*, 20*b* (e.g. the common or central pole 27 here). The pair of magnets 20*a*, 20*b* provides for a stronger magnetic field 25 and a more precise positioning and a greater attractive force relative to a single magnet (e.g. one of the pair of magnets 20*a*, 20*b* in isolation; and/or a singular magnet of similar total mass/material as the total of the pair of magnets 20*a*, 20*b* combined). The pair of magnets 20*a*, 20*b* defines or generates a magnetic field 25 sufficiently strong that merely a ferromagnetic material 30 is required in the coupling connector 11 to support the object—and no magnet as such is required in the coupling connector 11.

FIG. 5 shows a schematic view of the pair of magnets 20*a*, 20*b* of FIG. 3 with a first ferromagnetic element 30. The ferromagnetic element 30 in FIG. 5 comprises symmetry in at least one dimension. Here the ferromagnetic element 30 is rotationally symmetrical in at least one plane (e.g. that of the paper as viewed in FIG. 5). The ferromagnetic element 30 here is cylindrical, being rotationally symmetrical in the plane that is perpendicular to the common or central pole 27 of the magnets 20*a*, 20*b* of the coupling bracket 12. Accordingly the coupling connector 11 associated with the ferromagnetic element 30 is locatable in any orientation in that plane. As shown here, a central longitudinal axis of the cylindrical ferromagnetic element 30 is collinear with the common or central pole 27. Accordingly, the ferromagnetic element 30, and objected associated therewith, can be mounted in any orientation in the 360 degrees about the common or central pole 27. Such a coupling 10 can be particularly suited to applications whereby the orientation of the object to the support is less or not important. For example, where the coupling 10 is for a bar of soap or another object (not shown) suspended vertically from a support directly thereabove, the orientation of the object is less important than, for example, a door. Likewise, where the object as such is symmetrical or does not otherwise require alignment relative to the support, then the symmetrical ferromagnetic element 30 of FIG. 5 may be preferred compared to the asymmetrical ferromagnetic element 30 of FIG. 6.

FIG. 6 shows a schematic view of the pair of magnets 20*a*, 20*b* of FIG. 3 with a second version of a ferromagnetic element 30. The pair of magnets 20*a*, 20*b* are configured to define a three-dimensional magnetic field 25 such that the ferromagnetic element 30 of the coupling connector 11 is attracted thereto and also can be oriented thereby. Here, the coupling 10 is configured to magnetically define an orientation of the coupling connector 11 relative to the coupling bracket 12. The ferromagnetic element 30 shown in FIG. 6 is asymmetrical, having a longitudinal aspect for alignment with the magnetic field 25. Accordingly, the common or central pole 27 defined by the pair of magnets 20*a*, 20*b* determines the orientation of the ferromagnetic element 30, and thereby the associated coupling connector 11 (when the coupling connector 11 is magnetically coupled to the coupling bracket 12). Here it will be appreciated that the ferromagnetic element will be aligned in either 1 of 2 orientations in the plane shown in FIG. 6: that shown and rotated clockwise by 180 degrees. When incorporated in the coupling connector (not shown in FIG. 6), it will be appreciated that the ferromagnetic element 30 may be positioned towards one side or surface of the connector 11 such that the ferromagnetic element 30 defines a preferential side or surface of the connector 11 for coupling (e.g. the connector 30 may not be 'flipped' from the view shown in FIG. 6).

The magnetic force defined by the magnetic coupling bracket 12 is predetermined. The magnetic force comprises a maximum magnetic attractive force. The magnetic force is predetermined in dependence on the object to be supported. For example, where the coupling is for a door, such as for a door hinge (see e.g. FIG. 7), the magnetic force is configured to be less than 20 kg; even less than 10 kg; and in at least some examples, the coupling is configured to release at weight or force of 5 kg—or even less than 5 kg in particular instances. The provision of the plurality of magnets 20*a*, 20*b* with the common or central pole 27 is such that the tolerance for positioning and tolerance of relative release force is less than in convention magnetic couplings, such as where a singular magnet is provided. For example, the arrangement with the plurality of magnets 20*a*, 20*b* enables a lower release force than with a comparable coupling as defined in Applicant's earlier patent application, PCT/EP2018/059206 published as WO2018189206, the full contents of which are incorporated herein by reference.

It will be appreciated that a same or singular bracket 12 or type of bracket 12 may be used with a plurality of different coupling connectors 11 and in at least some examples different types of coupling connectors 11. For example, a same bracket 12 or similar type of bracket 12 may be used for supporting both a towel and a bar of soap.

The bracket 12 may be configured to support different types of object, such as different types of object of similar weight. For example, a same bracket 12 or similar type of bracket 12 may be used for supporting both a towel and a bar of soap. Additionally or alternatively, the bracket 12 may be configured to support different objects and/or different types of objects of different weights. For example, the same bracket 12 may be configured to support two different types of door leafs (or two different sizes of towels); with an option to maintain a same release force (proportional or absolute) by varying the ferromagnetic element in the corresponding coupling connectors (e.g. dimensions of ferromagnetic element 30 and/or offset/spacing from contact surface of the coupling connector 11).

Figure 8:
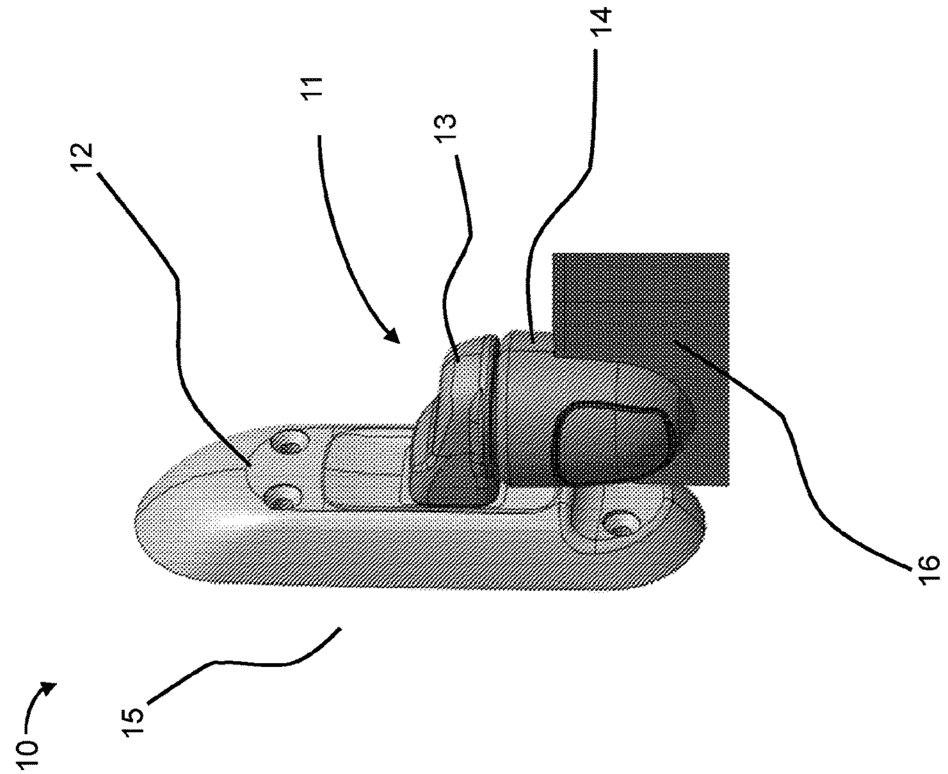
FIG. 8 shows a detailed view of the coupling of FIG. 7.
Figure 7:
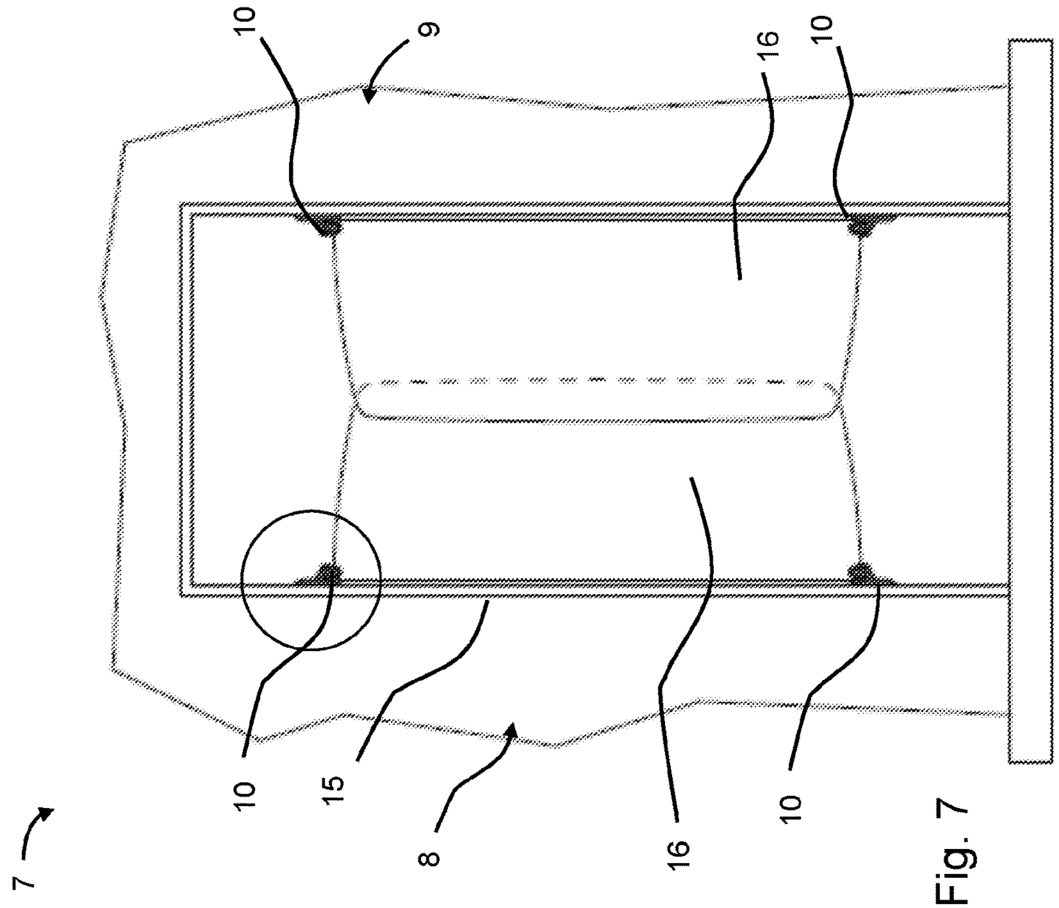
FIG. 7 shows a front view of an example doorway showing an example of a leaf system with a coupling according to this disclosure.

FIG. 7 shows a front view of an example doorway showing an example of a leaf system 9 with a coupling 10 according to this disclosure. In the example shown in FIG. 7 the coupling 10 comprises a hinge coupling, with FIG. 7 showing a front view of an example doorway 8 showing a first example of the leaf system 9 with a coupling 10 according to this disclosure. Here, the coupling 10 comprises an anti-ligature hinge coupling 10 for an anti-ligature door 8. FIG. 8 shows a detail view of the hinge coupling 10 of FIG. 7. The hinge coupling 10 comprises a hinge bracket 12, operatively associable with a support 15, shown here as a doorframe. Here, the coupling connector 11 of the hinge coupling 10 comprises a hinge leaf member 14 operatively associable with a leaf 16. The hinge leaf member 14 is connectable to the hinge bracket 12 as part of the coupling connector 11. Here, the coupling connector 11 comprises a stationary connector portion 13 and the hinge leaf member 14. Accordingly, the hinge leaf member 14 is rotatable relative to the hinge bracket 12 about an axis of rotation 21, as shown in FIG. 8, illustrating a detailed view of the coupling 10 of FIG. 7.

Figure 9:
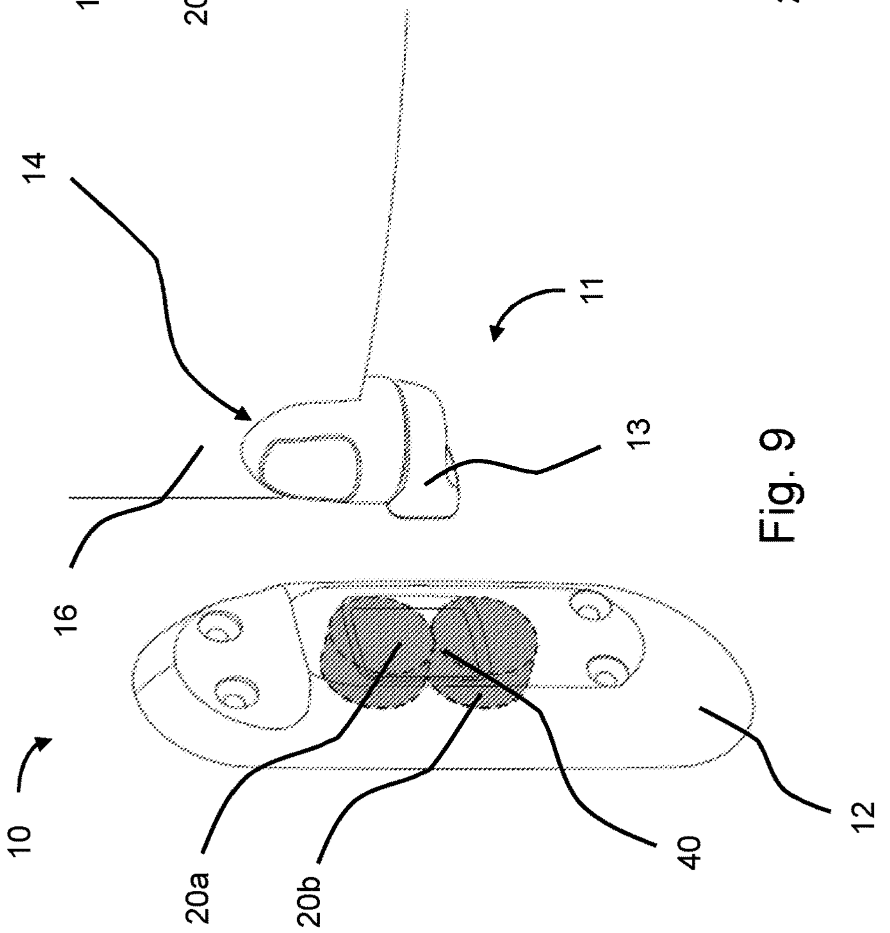
FIG. 9 shows a portion of the leaf system of FIG. 7, with magnets of the coupling bracket schematically shown.

FIG. 9 shows a portion of the leaf system 9 of FIG. 7, with the pair of magnets 20*a*, 20*b* of the coupling bracket 12 schematically shown—and the leaf 16 attached to the coupling connector 11 disconnected from the bracket 12. As shown in FIG. 9, it will be appreciated that the hinge member 14 is disconnectable from the hinge bracket 12 in response to at least one force threshold, shown as a transverse threshold force comprising a transverse force component transverse to the axis of rotation 21 in FIG. 9. Additionally here, that the hinge member 14 is disconnectable from the hinge bracket 12 in response to an axial threshold force comprising a force component acting along the axis of rotation 21, either upwards or downwards—irrespective of orientation of the bracket 12 attached to the support 15.

Figure 10:
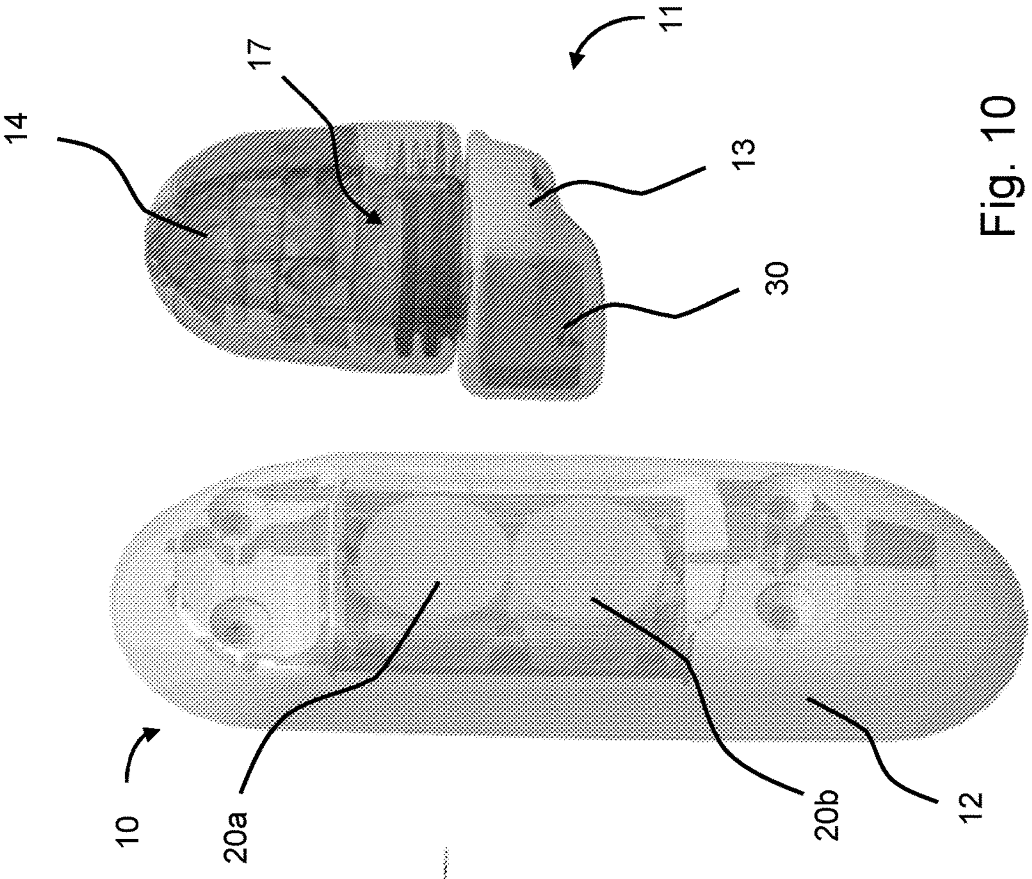
FIG. 10 shows the coupling of the system of FIG. 7, with the components shown in semi-transparency.

FIG. 10 shows the coupling of the system of FIG. 7, with the components shown in semi-transparency. In particular the cylindrical magnets 20*a*, 20*b* of the coupling bracket 12 and the cuboid-shaped ferromagnetic element 30 of the coupling connector 11 are visible. The hinge member 14 comprises a self-centring spring 17 in a pivot assembly to auto close the door leaf 16. The spring force is balanced with the magnet force to prevent the leaf 16 detaching when opening the door in normal use.

Figure 12:
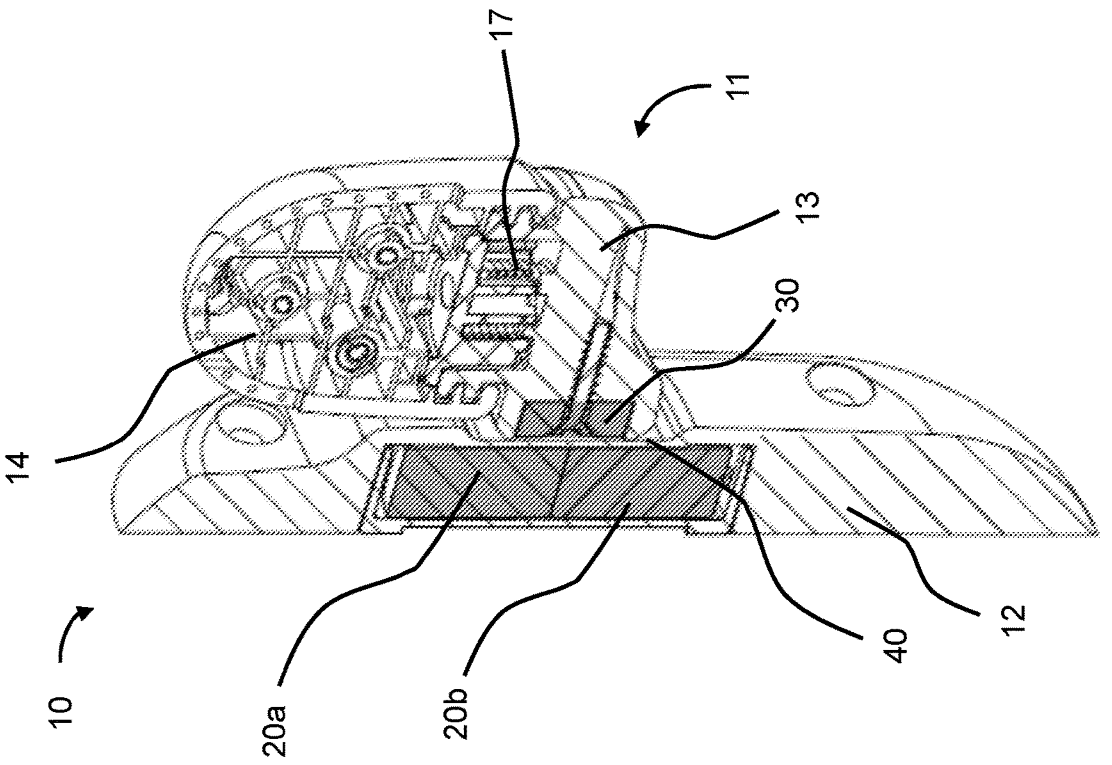
FIG. 12 shows an isometric ¾ view of the cross section of FIG. 11.
Figure 11:
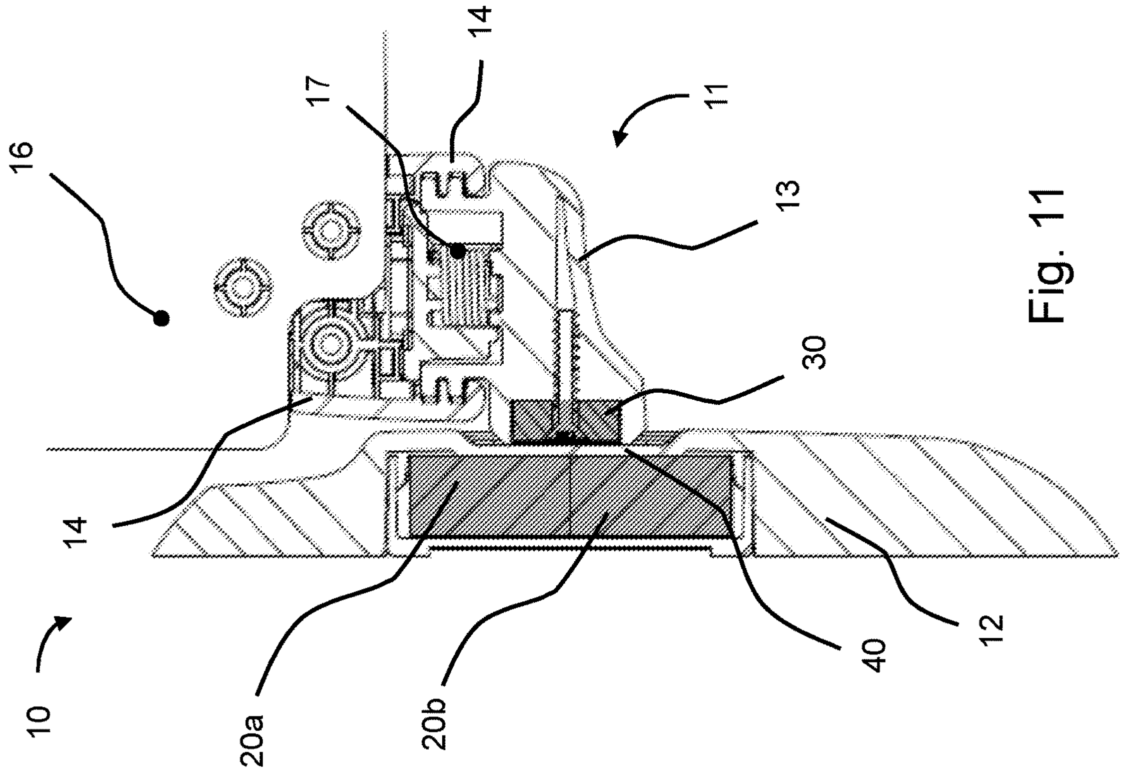
FIG. 11 shows a cross-section through a middle of the coupling of FIG. 9.

FIG. 11 shows a cross-section through a middle of the coupling 10 of FIG. 9, when the coupling 10 is connected, with the coupling connector 11 attracted to the coupling bracket 12 by the magnetic attractive force between the pair of magnets 20*a*, 20*b* and the ferromagnetic element 30. As shown here, the separation between the magnets 20*a*, 20*b* and the ferromagnetic element 30 when the coupling connector 11 is coupled is determined by the sum of the wall thicknesses of the respective walls of the coupling bracket 12 and the coupling connector 11 therebetwen. FIG. 12 shows an isometric ¾ view of the cross section of FIG. 11. Here it will be appreciated that all of: vertical position, lateral position and the orientation (e.g. verticality) of the coupling connector 11 are all determined by the attractive force between the asymmetrical ferromagnetic element 30 of the coupling connector and the magnetic field 25 as defined by the pair of magnets 20*a*, 20*b* of the coupling bracket 12. In addition, the bracket 12 shown here comprises a recess 40 for assisting in locating and centering the coupling connector 11. As visible from the cross-sectional views of FIGS. 11 and 12 in particular, the use of the recess 40 in the form of the dished centering feature allows a localized thinner wall thickness of the housing of the coupling bracket 12. Accordingly, a separation between the magnets 20*a*, 20*b* and the ferromagnetic element 30 of the coupling connector 30 is reduced, thereby enhancing the magnetic attractive force therebetween. The two magnets 20*a*, 20*b* arranged side by side creates a central pole 27 that attracts the steel 30 in the nib 11 to the centre of the recess 40. Accordingly no magnets are required in the leaf. The magnet assembly 20 and the recess 40 in the bracket 12 automatically centre the leaf nib 11 to the wall mount 12.

Figure 13:
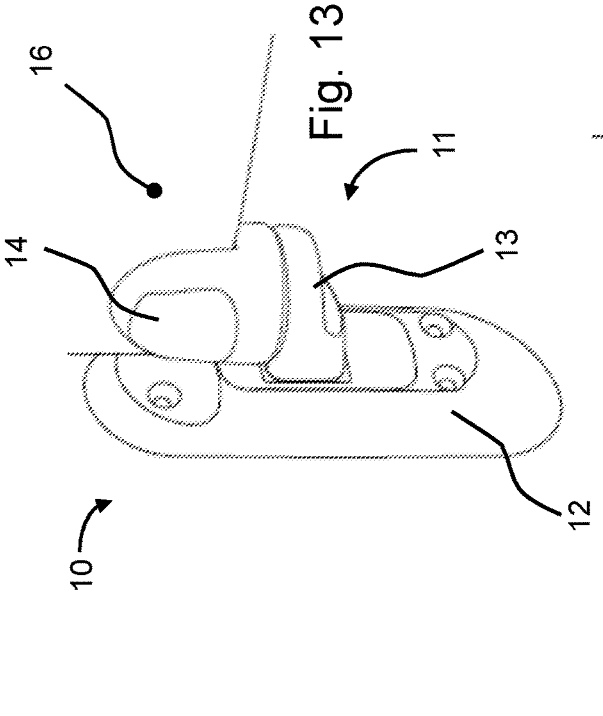
FIG. 13 shows the coupling connected.
Figure 14:
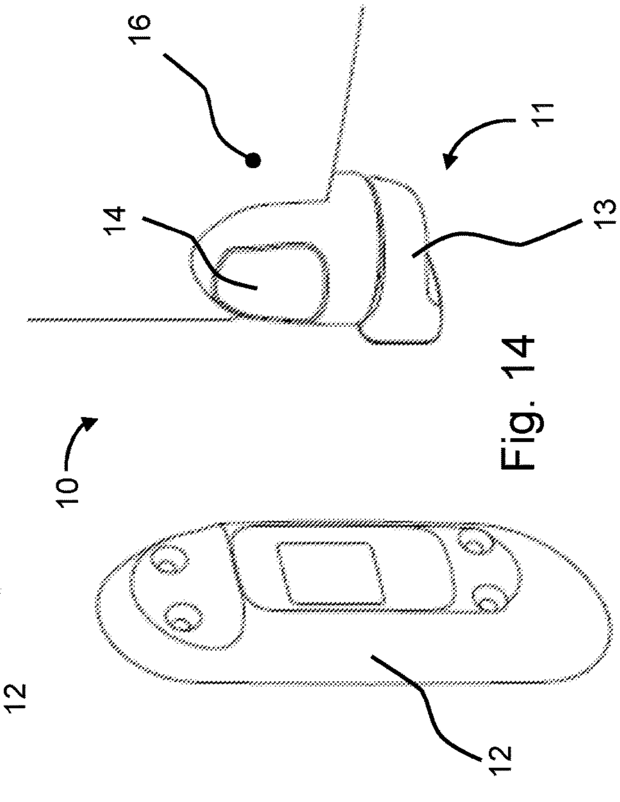
FIG. 14 shows the coupling disconnected.

FIG. 13 shows the coupling connected and FIG. 14 shows the coupling disconnected. Accordingly, the leaf 16 detaches from the wall with the pivot mechanism on the leaf 16. Only a low profile magnet housing 12 is secured to the wall. No magnets are present in the leaf nib. The leaf 16 can be detached in any direction.

Figure 15:
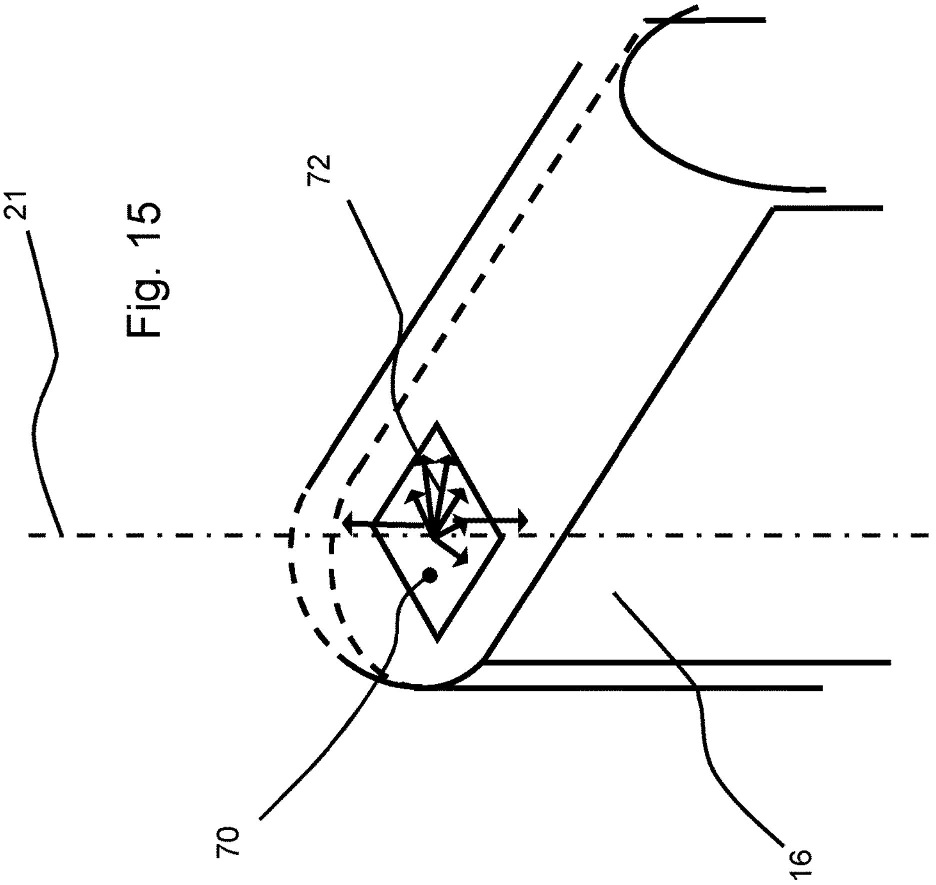
FIG. 15 schematically shows directions of possible disconnection of the coupling.

FIG. 15 schematically shows a portion of a door leaf 16 with directions 72 of possible disconnection of the coupling 10. In contrast to typical prior art hinges, the example coupling hinge 10 here allows the leaf 16 to be disconnected in response to a similar magnitude of transverse force from at least two directions. For instance, the hinge 10 allows the hinge member 14 to be disconnected in response to a same force from opposite sides of the coupling connector 11 or (e.g. the threshold force is the same whether the leaf 16 is pushed inwards or outwards—or whether the leaf 16 is pushed or pulled such to either open or close the door leaf 16). Likewise, in contrast to prior art hinges (such as a conventional butt hinge unresponsive to an axial force, particularly an axial force purely along the axis of rotation 21), the hinge 10 here enables disconnection of the hinge member 14 from the hinge bracket 12 in response to an axial force exceeding the axial force threshold. Here the coupling 10 is configured to allow release of the coupling connector 11 from the bracket 12 in any direction parallel to or away from the plane of the bracket 12. Accordingly, the hinge 10 here allows disconnection of the hinge member 14 (and leaf 16) from the hinge bracket 12 in response to a purely axial force acting at the hinge 10 in either axial direction—such as vertically upwards or downwards, along the axis of rotation 21. Similarly, the hinge 10 here allows disconnection of the hinge member 14 from the hinge bracket 12 when an axial force threshold is reached, irrespective of whether a transverse force threshold has been reached. Particularly where the axis of rotation 21 is vertical as shown here, the hinge 10 is useful in preventing the hinge 10 or associated leaf 16 from supporting an excessive weight.

As can be appreciated from FIG. 15 in particular, the coupling connector 11 is disconnectable from the hinge bracket 12 in a direction along the axis of rotation 21—here either in a downwards or an upwards direction as shown. Additionally, the hinge member 14 is disconnectable, as part of the coupling connector 11, from the hinge bracket 12 in a direction transverse to the axis of rotation 21, as illustrated by the arrows 72 in FIG. 15. The hinge 10 is configured to eliminate or reduce hanging points. For example, the coupling bracket 12 comprises a very low profile, with minimal projection out from the support 9; and the bracket's surfaces are sloped or directed downwards to ensure a ligature thereon is guided off the hinge 10 so that the coupling 10 cannot support a ligature.

The transverse direction comprises a direction in a plane 70 perpendicular to the axis of rotation 21. The transverse direction comprises a direction perpendicular to the axis of rotation 21. The hinge member 14 is disconnectable in response to the same transverse threshold force in at least three directions transverse to the axis of rotation 21. The transverse force threshold is independent of the direction of transverse force. For example, the hinge member 14 is disconnectable from the hinge bracket 12 in response to a transverse force threshold being reached, the transverse force threshold being the same for any direction of force in the plane perpendicular to the axis of rotation 21.

Figure 17:
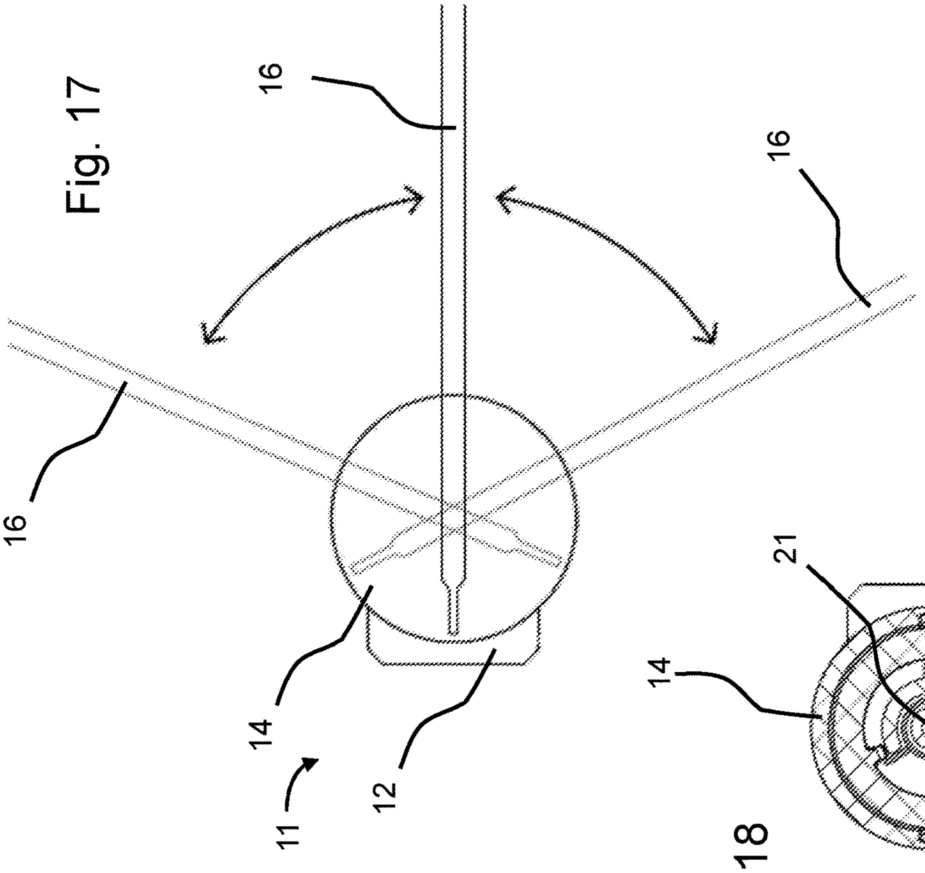
FIG. 17 schematically shows the rotation of the object in plan view.
Figure 16:
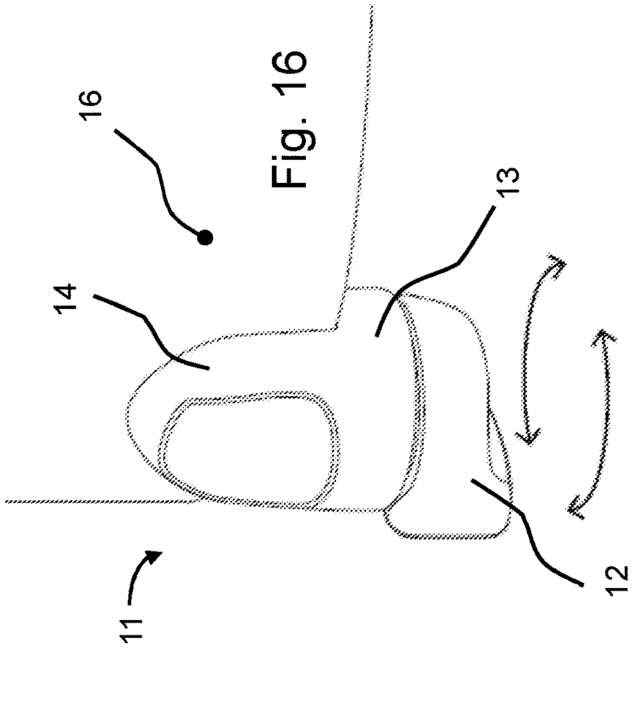
FIG. 16 illustrates relative rotation of the object associated with the coupling connector.
Figure 16:
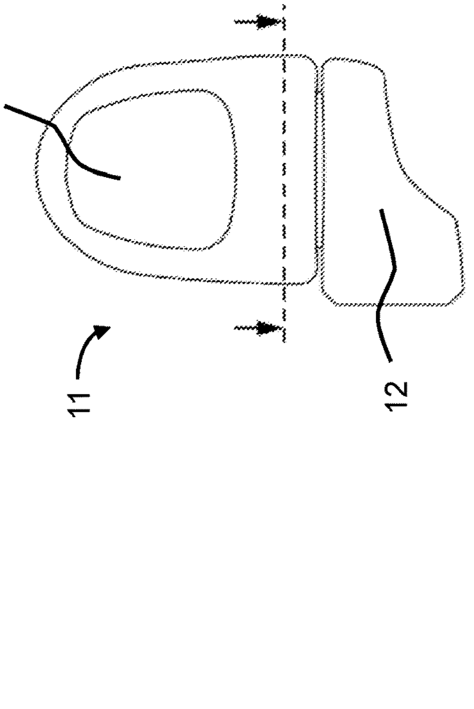

The threshold force is greater than a force required to open and/or close the leaf 16, such as in normal use to open and/or close the leaf 16, such as shown in FIGS. 16 and 17. FIG. 17 schematically shows the rotation of the leaf 16 in plan view; and illustrates relative rotation of the leaf 16 associated with the coupling connector, with the single leaf 16 shown sequentially in three respective positions in FIG. 17. The threshold force is less than a force required to create or support a ligature. The threshold force is less than a maximum force that can be exercised by a single person on the leaf 16. For example, the threshold force may less than a pushing force, such as to barge the leaf 16 open. The threshold force is a component of a non-perpendicular force, such as a component of a tangential force associated with rotation of the leaf 16 about the axis of rotation 21 (e.g. acting to open or close the leaf 16).

Figure 18:
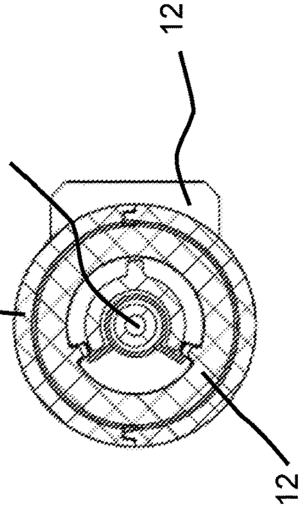
FIG. 18 shows a cross-section of the coupling connector in plan view.

FIG. 18 shows a cross-section of the coupling connector in plan view. When used as a hinge, the coupling 10 is suitable for any leaf 16, the leaf 16 comprising any movable member, such as any closure. In at least some examples, the support comprises one or more of: a jamb; a frame; a wall; a post; a lintel. The coupling 10 is for attaching the movable member, such as a door, shutter, window, soap, towel, towel rail, or the like to the support, such as a wall or frame or the like. The coupling bracket 12 comprises a fixed device, such as for attachment to a fixed surface (e.g. of a ceiling, jamb, lintel, frame, wall, or the like). In at least some examples, the coupling connector 11 comprises a movable device, such as for attachment to the movable member, such as a movable leaf 16 (e.g. a door leaf 16, window, shutter, flap, hatch, or the like). The leaf 16 comprises one or more of: a door leaf 16, a window leaf 16, a shutter leaf 16, a gate leaf 16, a hatch leaf 16, a panel.

Here, the leaf system 9 comprises a plurality of hinges 10 with a pair of hinges 10 associated with each single leaf 16. Each hinge 10 of the pair of hinges 10 is aligned on the same axis of rotation 21. Here, the hinges 10 comprise similar features. For example, each hinge 10 is configured to release at a similar threshold force. Here, the pair of hinges 10 is oppositely-oriented. For example, the hinge bracket 12 of a first hinge 10 of the pair is opposingly oriented, such as with the hinge brackets 12 of the pair facing each other. Here, where the axis of rotation 21 is a vertical axis, the respective coupling 10 of the pair is oriented upwards and downwards respectively. A single leaf 16 is supported by the pair of hinges 10, with the pair of hinges 10 being located at or towards a top and a bottom of the leaf 16 respectively. The leaf 16 is mounted between the hinges 10, with the leaf 16 being positioned on the axis of rotation 21 so that the axis of rotation 21 passes directly through the leaf 16, here through a medial plane of the leaf 16. Accordingly, the leaf 16 is bidirectionally rotatable under a similar magnitude of force (e.g. a similar force to move the leaf 16 in either rotational direction). Here, the coupling 10 comprises a leaf nib and door mount, with the coupling connector 11 being permanently-mounted to the leaf 16. In other examples, the coupling connector's hinge member 14 is integrally-formed with the leaf.

The coupling 10 is configured to eliminate or at least mitigate a risk of an element such as a ligature being trapped in, inserted into, or supported by the coupling 10. The coupling 10 is configured to ensure that there is no more than a maximum clearance, such as between the coupling bracket 12 and the coupling connector 11 when connected. The coupling 10 is configured to define the maximum clearance between parts. The maximum clearance is sufficiently small to eliminate or at least reduce the risk of element insertion or trapping. The maximum clearance is applicable to any separation or gap, such as between the coupling bracket 12 and the support; and/or between the coupling connector 11 and the coupling bracket 12; and/or between the leaf and the coupling bracket 12; and/or between the leaf and the support. The risk of an element trapping is reduced or eliminated by labyrinthine or backing geometry, so as to conceal and/or shield a gap or interface between parts, such as between moving parts (e.g. of the components 13, 14 of the coupling connector 11).

It will be appreciated that any of the aforementioned apparatus may have other functions in addition to the mentioned functions, and that these functions may be performed by the same apparatus.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims.

The applicant indicates that aspects of the present invention may consist of any such individual feature or combination of features. It should be understood that the embodiments described herein are merely exemplary and that various modifications may be made thereto without departing from the scope or spirit of the invention. For example, it will be appreciated that although shown here as a door hinge mounted to a wall or frame, in other examples other members or fittings may be attached (such as gates or shutters or fixtures from ceilings, walls or the like). Likewise, although shown here with the magnets in the coupling bracket and no magnets in the coupling connector, in other applications, such as where risks from disconnectable magnets are reduced (e.g. no/reduced risk of swallowing, etc.), the coupling connector may comprise the magnets; and/or in at least some examples both the coupling bracket and the coupling connector may comprise one or more magnets. Where features of couplings are described here in conjunction with a hinge embodiment, it will be apparent that those features are applicable as appropriate to non-hinge couplings, such as for suspending or supporting non-moving objects (e.g. towel rails, soap bars, etc.).

The invention claimed is:

1. An anti-ligature magnetic coupling, the coupling comprising:

a coupling bracket operatively associable with a support; and a coupling connector operatively associable with an object to be supported;

the coupling connector being connectable to the coupling bracket;

wherein the bracket comprises at least two magnets arranged to define a combined magnetic field for supporting the object via the coupling connector; and wherein no magnet is comprised in the coupling connector, the coupling connector comprising a ferromagnetic element configured to be attracted to the bracket's combined magnetic field.

2. The anti-ligature magnetic coupling of claim 1, wherein the coupling connector is disconnectable from the coupling bracket when a force on the connector exceeds a magnetic attractive force between the coupling bracket and the coupling connector.

3. The anti-ligature magnetic coupling of claim 1, wherein the magnetic coupling is configured to magnetically locate the object relative to the support primarily magnetically.

4. The anti-ligature magnetic coupling of claim 1, wherein the magnetic coupling is configured to locate the object relative to the support without requiring a mechanical location feature.

5. The anti-ligature magnetic coupling of claim 1, wherein the bracket and connector are both devoid of mechanical locating or centering features.

6. The anti-ligature magnetic coupling of claim 1, wherein the coupling is configured to provide both magnetic and mechanical locating features.

7. The anti-ligature magnetic coupling of claim 1, wherein the coupling is configured to support the object entirely magnetically.

8. The anti-ligature magnetic coupling of claim 1, wherein the coupling comprises an inter-engaging mechanical coupling arrangement.

9. The anti-ligature magnetic coupling of claim 1, wherein the ferromagnetic element comprises a footprint sufficiently small to self-locate in the magnetic field defined by the coupling bracket.

10. The anti-ligature magnetic coupling of claim 1, wherein the at least two magnets are arranged to align at last a portion of their respective magnetic fields such that the magnetic field portions are substantially parallel and acting in a same direction to define a common or central pole.

11. The anti-ligature magnetic coupling of claim 10, wherein the magnets define a three-dimensional magnetic field such that the ferromagnetic element of the coupling connector is attracted thereto and also oriented thereby to magnetically define an orientation of the coupling connector relative to the coupling bracket.

12. The anti-ligature magnetic coupling of claim 10, wherein the plurality of magnets comprises at least a pair of magnets arranged side by side to create the common or central pole to attract the ferromagnetic element into a central position defined between the magnets of the pair.

13. The anti-ligature magnetic coupling of claim 1, wherein each of the magnets is substantially the same.

14. The anti-ligature magnetic coupling of claim 1, wherein the magnetic force is predetermined in dependence on the object to be supported.

15. The anti-ligature magnetic coupling of claim 14, wherein the coupling is for a door and the magnetic force is configured to be less than 20 kg.

16. The anti-ligature magnetic coupling of claim 1, wherein the coupling connector is rotatable relative to the coupling bracket about an axis of rotation, and wherein further the coupling connector is disconnectable from the coupling bracket in response to at least one force threshold.

17. The anti-ligature magnetic coupling of claim 16, wherein the at least one force threshold comprises a transverse threshold force, having a transverse force component transverse to the axis of rotation defined by the coupling; and the coupling connector is configured to disconnect in response to a same force from opposite sides of the coupling connector, such as whether the threshold force is the same whether the object is pushed or pulled.

18. The anti-ligature magnetic coupling of claim 16, wherein the coupling connector is disconnectable from the coupling bracket in response to an axial force exceeding an axial force threshold, wherein the coupling connector is disconnectable from the coupling bracket along the axis of rotation or in a direction transverse to the axis of rotation.

19. The anti-ligature magnetic coupling of claim 1, comprised in a door leaf system together with a door leaf.

20. A method of connecting the anti-ligature coupling of claim 1, the method comprising:

operatively associating the coupling bracket with the support;

operatively associating the coupling connector with the object to be supported;

connecting the coupling connector to the coupling bracket using the at least two magnets of the coupling bracket with their combined magnetic field supporting the object via the ferromagnetic element of the coupling connector.

* * * * *